(12) United States Patent
Takahashi

(10) Patent No.: US 10,152,808 B2
(45) Date of Patent: Dec. 11, 2018

(54) COMPUTER-READABLE RECORDING MEDIUM, COMPUTER APPARATUS, AND COMPUTER PROCESSING METHOD

(71) Applicant: SQUARE ENIX CO., LTD., Tokyo (JP)

(72) Inventor: Hideyuki Takahashi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 27 days.

(21) Appl. No.: 15/355,402

(22) Filed: Nov. 18, 2016

(65) Prior Publication Data

US 2017/0148194 A1   May 25, 2017

(30) Foreign Application Priority Data

Nov. 20, 2015   (JP) ................. 2015-228181

(51) Int. Cl.
| | |
|---|---|
| *G06T 11/20* | (2006.01) |
| *A63F 13/577* | (2014.01) |
| *A63F 13/63* | (2014.01) |
| *A63F 13/52* | (2014.01) |
| *A63F 13/60* | (2014.01) |
| *A63F 13/53* | (2014.01) |
| *G06T 15/00* | (2011.01) |
| *G06T 19/00* | (2011.01) |

(52) U.S. Cl.
CPC ............ *G06T 11/203* (2013.01); *A63F 13/52* (2014.09); *A63F 13/53* (2014.09); *A63F 13/577* (2014.09); *A63F 13/60* (2014.09); *A63F 13/63* (2014.09); *G06T 15/00* (2013.01); *G06T 19/00* (2013.01)

(58) Field of Classification Search
CPC ....... G06T 11/40; G06T 11/203; G06T 17/00; G06T 11/001; G06T 11/00
See application file for complete search history.

(56) References Cited

FOREIGN PATENT DOCUMENTS

| | | |
|---|---|---|
| JP | 2005-234793 | 9/2005 |
| JP | 2005234793 A * | 9/2005 |

OTHER PUBLICATIONS

Dungeon Keeper 2; 1999; Bullfrog Productions; https://www.gog.com/game/dungeon_keeper_2.*

(Continued)

*Primary Examiner* — Todd Buttram
(74) *Attorney, Agent, or Firm* — Greenblum & Bernstein, P.L.C.

(57) ABSTRACT

A program executed in a computer apparatus that causes the computer apparatus to function as: an placer that places an object having a display mode according to an attribute; a first display mode identifier that identifies a display mode of a face which is not in contact with a different placed object according to an attribute of a placed object; a second display mode identifier that identifies, with respect to plural placed objects which are adjacent to each other and have different attributes, a display mode of a face which is not in contact with a different placed object according to an attribute of the placed object and an attribute of an adjacent placed object; and a drawer that draws a placed object on a display screen according to a display mode identified by the first display mode identifier and a display mode identified by the second display mode identifier.

7 Claims, 7 Drawing Sheets

(56) References Cited

OTHER PUBLICATIONS

Dragon Keeper™ 2 on GOG.com published on Nov. 15, 2015 (https://web-beta.archive.org/web/20151115193447/https://www.gog.com/game/dungeon_keeper_2).
Minecraft (on Wikipedia) published on Nov. 15, 2015 (https://en.wikipedia.org/w/index.php?title=Minecraft&oldid=690801259).
Graphics pipeline (on Wikipedia) published on Oct. 21, 2015 (https://en.wikipedia.org/w/index.php?title=Graphics_pipeline&oldid=686744845).
Extended European Search Report dated Apr. 24, 2017 for European Application No. 16199647.5-1905.
"Minecraft", Dengeki PlayStation, vol. 21, No. 17, Kadokawa Corporation, May 14, 2015, along with a partial English translation thereof.
Japanese Office Action issued in Japan Patent Appl. No. JP 2015-228181 dated Nov. 8, 2016, along with a partial English translation thereof.

\* cited by examiner

FIG. 5

OBJECT MASTER TABLE

| OBJECT ID | ATTRIBUTE | OBJECT TYPE | PRIORITY |
|---|---|---|---|
| Obj-001 | SOIL | SOIL | 2 |
| Obj-002 | | CLAY | |
| Obj-003 | | ROCK | |
| Obj-004 | GRASS | GRASS FIELD | 3 |
| Obj-005 | | SHRUB | |
| Obj-006 | | FLOWER | |
| Obj-007 | WATER | SEA | 0 |
| Obj-008 | | RIVER | |
| Obj-009 | | LAKE | |
| Obj-010 | SAND | DESERT | 1 |
| Obj-011 | | ROCK | |
| Obj-012 | | OASIS | |
| ... | ... | ... | ... |

TEXTURE MASTER TABLE

| TEXTURE ID | OBJECT ID | ATTRI-BUTE | ADJACENT OBJECT TYPE | TEXTURE DATA |
|---|---|---|---|---|
| txt0001 | Obj-001 (SOIL) | SOIL | NONE | SOIL |
| txt0002 | | | GRASS FIELD | SOIL, GRASS FIELD |
| txt0003 | | | GRASS FIELD, GRASS FIELD | SOIL, GRASS FIELD, GRASS FIELD |
| txt0004 | | | GRASS FIELD, GRASS FIELD, GRASS FIELD | SOIL, GRASS FIELD, GRASS FIELD, GRASS FIELD, |
| txt0005 | | | ... | ... |
| ... | ... | ... | ... | ... |
| txt0101 | Obj-004 (GRASS FIELD) | GRASS | NONE | GRASS FIELD |
| txt0102 | | | ... | ... |
| ... | ... | ... | ... | ... |
| txt0201 | Obj-007 (SEA) | WATER | NONE | SEA |
| txt0202 | | | SOIL | SEA, SOIL |
| txt0203 | | | SOIL, SOIL | SEA, SOIL, SOIL |
| ... | | | ... | ... |
| txt02x1 | | | GRASS FIELD, DESERT | SEA, GRASS FIELD, DESERT |
| txt02x2 | | | GRASS FIELD, DESERT, SOIL | SEA, GRASS FIELD, DESERT, SOIL |
| ... | ... | ... | ... | ... |

41 42 43 44 45

40

FIG. 8
(a)
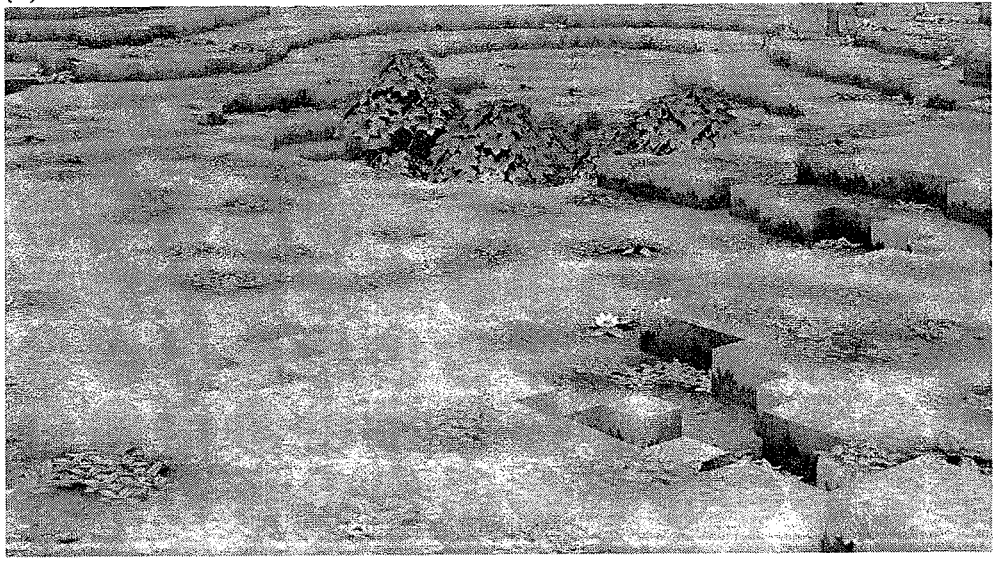
(b)
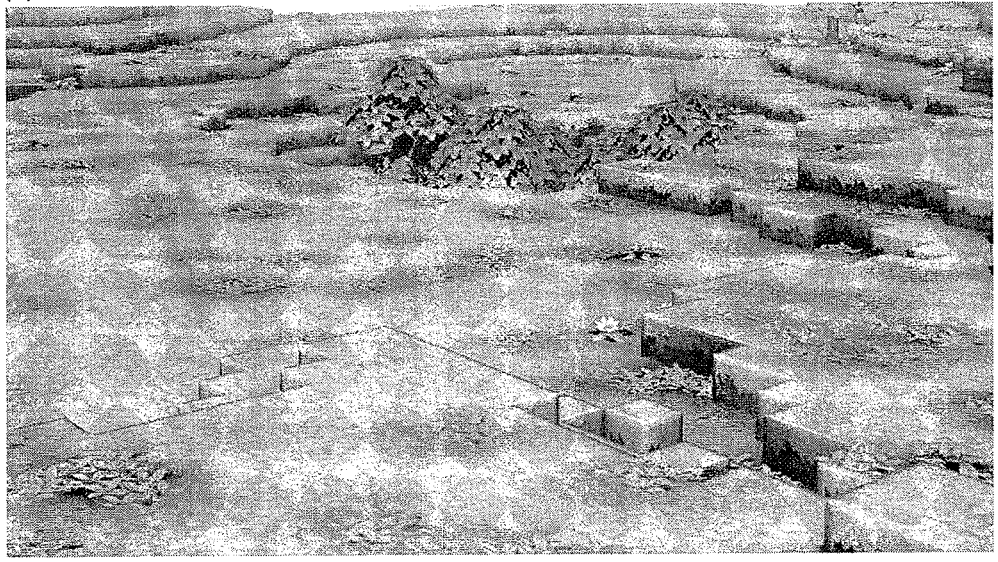

COMPUTER-READABLE RECORDING MEDIUM, COMPUTER APPARATUS, AND COMPUTER PROCESSING METHOD

CROSS REFERENCE TO RELATED APPLICATION

The present disclosure relates to subject matter contained in Japanese Patent Application No. 2015-228181, filed on Nov. 20, 2015, the disclosure of which is expressly incorporated herein by reference in its entirety.

BACKGROUND OF THE INVENTION

Field of the Invention

The present invention relates to a computer-readable recording medium, a computer apparatus, and a computer processing method.

Description of Related Art

In the related art, a sandbox type game in which a player can move an object in a virtual space, generate and place a new object, remove an object to freely make a building, or change a terrain is known. In a sandbox type game, as an object which is a target for movement or placement, a cubic object may be adopted.

SUMMARY OF THE INVENTION

Technical Problem

However, it is found that among cubic objects, for example, in a case where a "rock" object is placed to be adjacent to a "grass" object, a boundary line between the "rock" and "grass" becomes a straight line, which looks unnatural. In a case where objects having different attributes are placed to be adjacent to each other, a boundary line between the objects becomes a straight line, which results in incompatibility in a terrain.

An object of at least one embodiment of the invention is to provide a recording medium, a computer apparatus, and an execution method capable of display in which a boundary line between adjacent objects becomes natural.

Solution to Problem

According to a non-limiting aspect, a non-transitory computer-readable recording medium having recorded thereon a program which is executed in a computer apparatus that causes the computer apparatus to function as: an object placer that places a rectangular parallelepiped object having a given attribute and a display mode according to the given attribute in a virtual space; a first display mode identifier that identifies a display mode of a face of a placed object which is not in contact with a different placed object according to an attribute of the placed object; a second display mode identifier that identifies, with respect to at least one of a plurality of placed objects which are adjacent to each other and have different attributes, a display mode of a face thereof which is not in contact with a different placed object according to an attribute of the placed object and an attribute of an adjacent placed object; and a drawer that performs drawing for displaying a placed object on a display screen, according to a display mode identified by the first display mode identifier and a display mode identified by the second display mode identifier, wherein the second display mode identifier preferentially performs execution with respect to the first display mode identifier.

According to a non-limiting aspect, a computer apparatus including: an object placer that places a rectangular parallelepiped object having a given attribute and a display mode according to the given attribute in a virtual space; a first display mode identifier that identifies a display mode of a face of a placed object which is not in contact with a different placed object according to an attribute of the placed object; a second display mode identifier that identifies, with respect to at least one of a plurality of placed objects which are adjacent to each other and have different attributes, a display mode of a face thereof which is not in contact with a different placed object according to an attribute of the placed object and an attribute of an adjacent placed object; and a drawer that performs drawing for displaying a placed object on a display screen, according to a display mode identified by the first display mode identifier and a display mode identified by the second display mode identifier, wherein the second display mode identifier preferentially performs execution with respect to the first display mode identifier.

According to a non-limiting aspect, an execution method executed in a computer apparatus, including: an object placing step of placing a rectangular parallelepiped object having a given attribute and a display mode according to the given attribute in a virtual space; a first display mode identifying step of identifying a display mode of a face of a placed object which is not in contact with a different placed object according to an attribute of the placed object; a second display mode identifying step of identifying, with respect to at least one of a plurality of placed objects which are adjacent to each other and have different attributes, a display mode of a face thereof which is not in contact with a different placed object according to an attribute of the placed object and an attribute of an adjacent placed object; and a drawing step of performing drawing for displaying a placed object on a display screen, according to a display mode identified in the first display mode identifying step and a display mode identified in the second display mode identifying step, wherein the second display mode identifying step preferentially performs execution with respect to the first display mode identifying step.

Advantageous Effects of Invention

One or more of the above problems can be solved with each embodiment of the present invention.

BRIEF DESCRIPTION OF THE DRAWINGS

FIG. 5 is a diagram showing an object master table, corresponding to at least one of embodiments of the invention.

FIG. 6 is a diagram showing a texture master table, corroding to at least one of embodiments of the invention.

FIG. 8 is a diagram relating to attachment of textures for objects, corresponding to at least one of embodiments of the invention.

DESCRIPTION OF EMBODIMENTS

Hereinafter, embodiments of the invention will be described with reference to the accompanying drawings. Hereinafter, description relating to effects shows an aspect of the effects of the embodiments of the invention, and does not limit the effects. Further, the order of respective processes that form a flowchart described below may be changed in a range without contradicting or creating discord with the processing contents thereof.

First Embodiment

Figure 1:
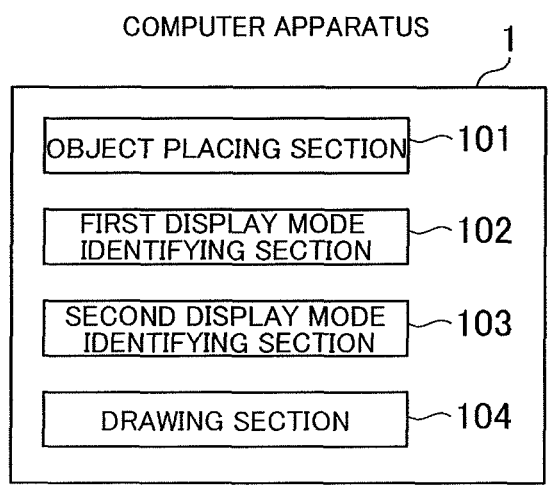
FIG. 1 is a block diagram illustrating a configuration of a computer apparatus, corresponding to at least one of embodiments of the invention.

An outline of a first embodiment of the invention will be described. FIG. 1 is a block diagram illustrating a configuration of a computer apparatus corresponding to at least one of embodiments of the invention. A computer apparatus 1 includes at least an object placing section 101, a first display mode identifying section 102, a second display mode identifying section 103, and a drawing section 104.

The object placing section 101 has a function of placing a rectangular parallelepiped object having a given attribute and a display mode according to the given attribute in a virtual space. The first display mode identifying section 102 has a function of identifying a display mode of a face of a placed object which is not in contact with a different placed object according to an attribute of the placed object. The second display mode identifying section 103 has a function of identifying, with respect to at least one of plural placed objects which are adjacent to each other and have different attributes, a display mode of a face thereof which is not in contact with a different placed object according to an attribute of the placed object and an attribute of an adjacent placed object. The drawing section 104 has a function of performing drawing for displaying a placed object on a display screen, according to a display mode identified by the first display mode identifying section 102 and a display mode identified by the second display mode identifying section 103.

Figure 2:
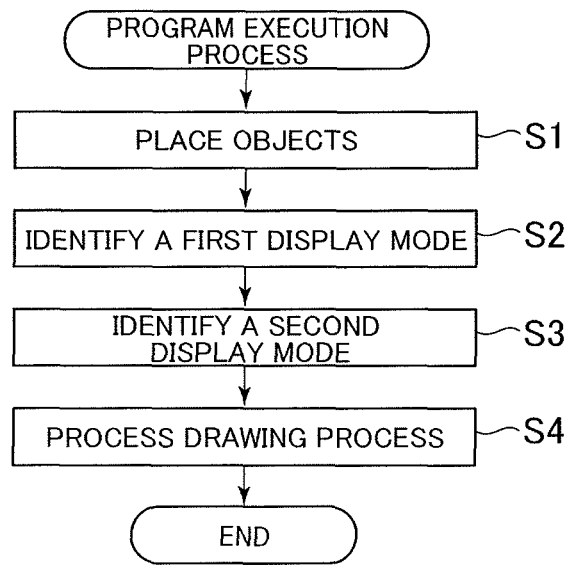
FIG. 2 is a flowchart of a program execution process, corresponding to at least one of the embodiments of the invention.

A program execution process according to the first embodiment of the invention will be described. FIG. 2 is a flowchart of a program execution process corresponding to at least one of embodiments of the invention.

The computer apparatus 1 places a rectangular parallelepiped object having a given attribute and a display mode according to the given attribute in a virtual space (step S1). The computer apparatus 1 identifies a display mode of a face of a placed object which is not in contact with a different placed object, according to the attribute of the placed object (step S2).

The computer apparatus 1 identifies, with respect to at least one of plural placed objects which are adjacent to each other and have different attributes, a display mode of a face thereof which is not in contact with a different placed object according to an attribute of the placed object and an attribute of an adjacent placed object (step S3). Then, the computer apparatus 1 performs drawing for displaying the placed object on a display screen according to the display mode identified by the first display mode identifier and the display mode identified by the second display mode identifier (step S4), and terminates the procedure.

In the first embodiment, the second display mode identifier preferentially performs execution with respect to the first display mode identifier.

According to an aspect of the first embodiment, it is possible to perform display so that a boundary line between adjacent objects becomes natural.

In the first embodiment, the "computer apparatus" refers to a desktop type or notebook type personal computer, a tablet computer, a PDA, or the like, for example, and may be a mobile terminal in which a display screen includes a touch panel sensor. The "virtual space" refers to a virtual space on a computer or a network, for example, which means a space in a game.

The "attribute" refers to an attribute or characteristic that belongs to a certain object, for example. The "object" refers to a tangible object that can be placed in a virtual space, for example. The "display screen" refers to an image displayed on a movie screen or a TV picture tube, for example. The "drawing" refers to a process of generating an image, for example.

Second Embodiment

Next, an outline of a second embodiment of the invention will be described. A configuration of a computer apparatus according to the second embodiment may adopt the same configuration as in the block diagram of FIG. 1.

The computer apparatus 1 includes at least the object placing section 101, the first display mode identifying section 102, the second display mode identifying section 103, and the drawing section 104.

The object placing section 101 has a function of placing a rectangular parallelepiped object having a given attribute and a display mode according to the given attribute in a virtual space. The first display mode identifying section 102 has a function of identifying a display mode of a face of a placed object which is not in contact with a different placed object according to an attribute of the placed object.

A priority relating to which placed object among adjacent placed objects has its display mode identified is set for each attribute, and the second display mode identifying section 103 has a function of identifying, with respect to a display mode of a placed object having an attribute of a low priority among placed objects which are adjacent to each other, a display mode of a face thereof which is not in contact with a different placed object according to the attribute of the placed object and an attribute of an adjacent placed object. The drawing section 104 has a function of performing drawing for displaying a placed object on the display screen according to the display mode identified by the first display mode identifying section 102 and the display mode identified by the second display mode identifying section 103.

A program execution process according to the second embodiment of the invention will be described. A flowchart of the program execution process in the second embodiment may adopt the same configuration as in the flowchart in FIG. 1.

The computer apparatus 1 places a rectangular parallelepiped object having a given attribute and a display mode according to the given attribute in a virtual space (step S1). The computer apparatus 1 identifies a display mode of a face of a placed object, which is not in contact with a different placed object, according to the attribute of the placed object (step S2).

The computer apparatus 1 identifies, with respect to a display mode of a placed object having a low priority attribute among placed objects which are adjacent to each other, a display mode of a face thereof which is not in contact with a different placed object according to an attribute of the placed object and an attribute of an adjacent placed object (step S3). Then, the computer apparatus 1 performs drawing for displaying the placed object on a display screen according to the display mode identified by the first display mode identifier and the display mode identified by the second display mode identifier (step S4), and terminates the procedure.

In the second embodiment, the second display mode identifier preferentially performs execution with respect to the first display mode identifier.

According to an aspect of the second embodiment, it is possible to perform display so that a boundary line between adjacent objects becomes natural.

In the second embodiment, the "computer apparatus", the "virtual space", the "attribute", the "object", the "display screen", and the "drawing" are the same as the contents disclosed in the first embodiment, respectively.

Third Embodiment

Figure 3:
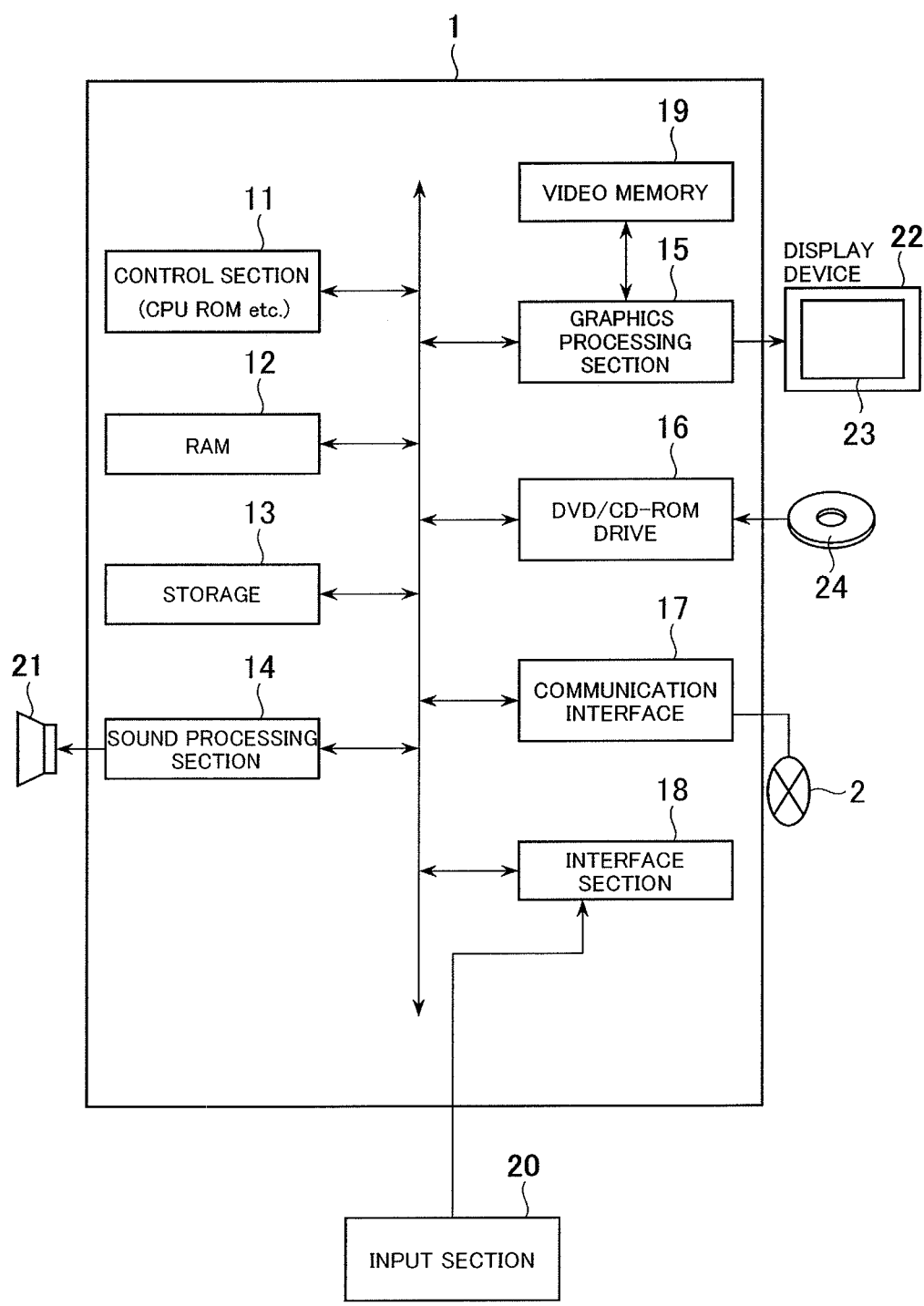
FIG. 3 is block diagram illustrating a configuration of a computer apparatus, corresponding to at least one of embodiments of the invention.

Next, an outline of a third embodiment of the invention will be described. FIG. 3 is block diagram illustrating a configuration of a computer apparatus according to at least one of embodiments of the invention. A computer apparatus 1 includes at least a control section 11, a random access memory (RAM) 12, a storage 13, a sound processing section 14, a graphics processing section 15, a DVD/CD-ROM drive 16, a communication interface 17, and an interface section 18, which are connected to each other through an internal bus.

The control section 11 includes a central processing unit (CPU) and a ROM (read only memory). The control section 11 executes a program stored in the storage 13 or a recording medium 24 to control the computer apparatus 1. Further, the control section 11 includes an internal timer that clocks time. The RAM 12 is a work area of the control section 11. The storage 13 is a storage area for storing a program or data.

The DVD/CD-ROM drive 16 is a unit in which the recording medium 24 on which a program is stored such as a DVD-ROM or a CD-ROM can be mounted. For example, a program and data are stored on the recording medium 24. The program and data are read from the recording medium 24 by the DVD/CD-ROM drive 16, and are loaded into the RAM 12.

The control section 11 reads the program and data from the RAM 12 and performs a process. The control section 11 processes the program and data loaded in the RAM 12 to output a sound output instruction to the sound processing section 14, and to output a drawing command to the graphics processing section 15.

The sound processing section 14 is connected to a sound output device 21 which is a speaker. If the control section 11 outputs a sound output instruction to the sound processing section 14, the sound processing section 14 outputs a sound signal to the sound output device 21.

The graphics processing section 15 is connected to a display device 22. The display device 22 includes a display screen 23. If the control section 11 outputs a drawing command to the graphics processing section 15, the graphics processing section 15 develops an image into a video memory (frame buffer) 19, and outputs a video signal for displaying the image on the display screen 23. The graphics processing section 15 executes drawing for one image in the unit of frames. One frame time of the image is 1/30 seconds, for example. The graphics processing section 15 has a function of receiving a part of a computational process relating to the drawing performed only by the control section 11 to disperse a load of an entire system.

The input section 20 (for example, a mouse, a keyboard, or the like) may be connected to the interface section 18. Information input through the input section 20 from a user is stored in the RAM 12, and the control section 11 executes a variety of computational processes based on the input information. Alternatively, a configuration in which a storage medium reading device is connected to the interface section 18 and a program, data or the like is read from a memory or the like may be used. Further, the display device 22 that includes a touch panel may be used as the input section 20.

The communication interface 17 may be connected to a communication network 2 in a wireless or wired manner, and may perform transmission and reception of information with other computer apparatuses through the communication network 2.

Figure 4:
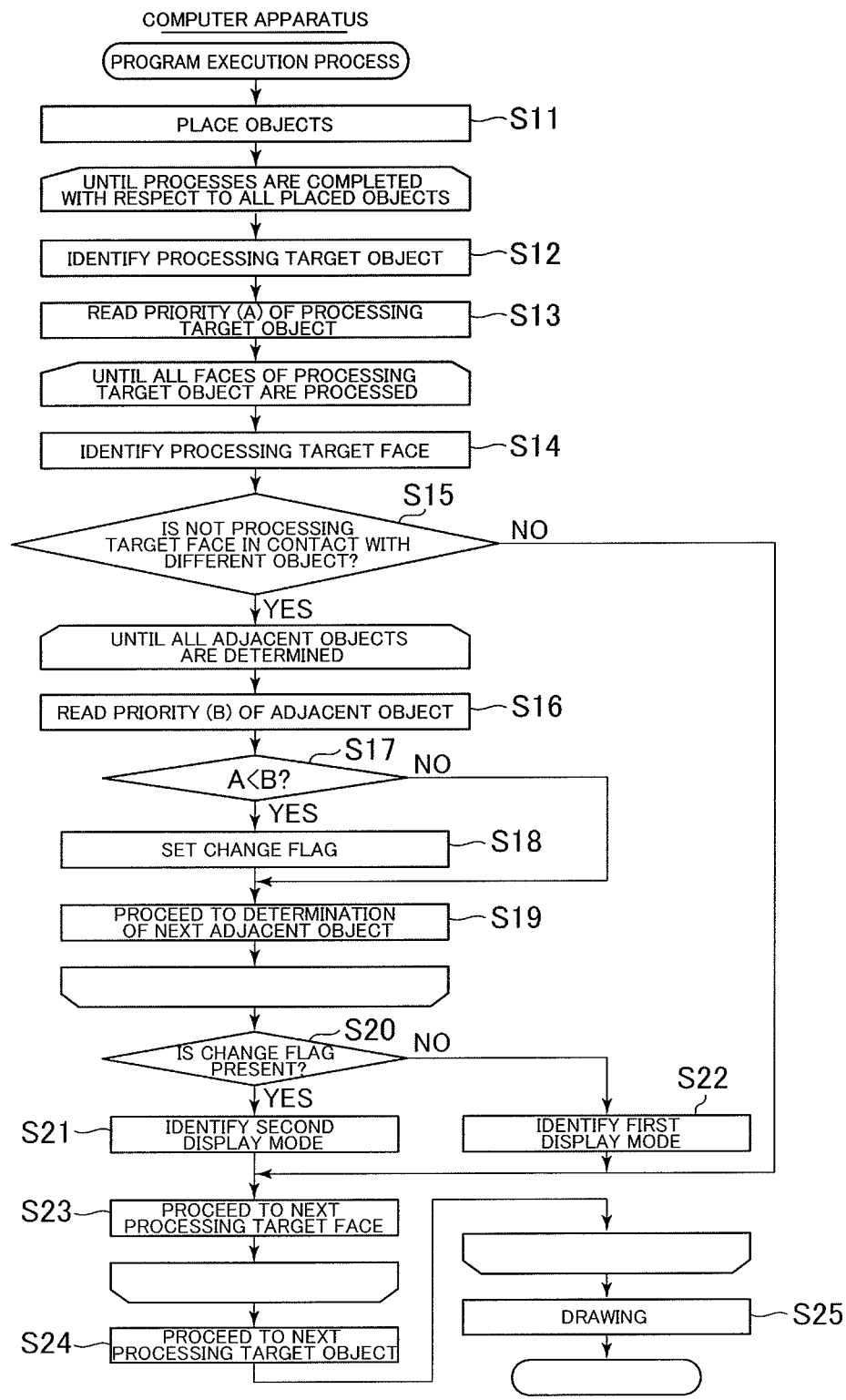
FIG. 4 is a flowchart of a program execution process, corresponding to at least one of the embodiments of the invention.

Next, a program execution process in the third embodiment of the invention will be described. The program execution process is executed in the control section 11. FIG. 4 is a flowchart of a program execution process corresponding to at least one of embodiments of the invention.

First, plural objects are placed in a virtual space (step S11). Plural parallelepiped virtual boxes that have the same shapes and sizes and are respectively aligned in three axial directions orthogonal to each other are set in the virtual space. The placed objects have the same shapes and sizes as those of the virtual boxes. The objects are placed to match the shapes of the virtual boxes.

Until all the objects placed in the virtual space are completely processed, processes of steps S11 to S24 are repeatedly executed. First, a processing target object is identified (step S12). Then, a priority (A) of the identified processing target object is read from an object master table in the RAM 12 or the storage 13 (step S13).

FIG. 5 is a diagram showing an object master table corresponding to at least one of embodiments of the invention. In an object master table 30, an object attribute 32, an object type 33, and a priority 34 are stored in association with an object ID 31. In step S13, the priority (A) is identified from the object ID 31 corresponding to a processing target object.

However, any one attribute among plural attributes 32 such as "soil", "grass", "water" or "sand" is set for an object, for example. Further, even with respect to the same attribute 32, plural types of objects are prepared. For example, as objects of the "soil" attribute 32, a "soil" object, a "clay" object, and a "rock" object are present. Even in the same attribute, since display modes of objects vary according to types 33, it is possible to provide variations in displays of objects.

Since one object includes six faces, but until all the faces are completely processed, the processes of steps S14 to S22 are repeatedly executed. First, any one face among the six faces of a processing target object is identified as a processing target face (step S14).

Then, it is determined whether the processing target face is not in contact with a different object (step S15). Since virtual boxes have the same shapes and sizes and are respectively aligned in three axial directions orthogonal to each other and an object is placed to match the shape of each virtual boxes, in a case where two objects are adjacently placed, one face among six faces of one object is in a state of being in contact with a face of the other object, which cannot be visually recognized from the outside. Thus, a display mode of only the face which is not in contact with the face of the other object is identified.

In step S15, in a case where it is determined that the processing target face is not in non-contact with the other object, that is, it is determined that the processing target face is in contact with the other object (NO in step S15), the processing target face transitions to the next face (step S23), the processes of steps S14 to S22 are executed with respect to the next processing target face.

On the other hand, it is determined in step S15 that the processing target face is not in contact with the other object (YES in step S15), and the processes of steps S16 to S19 are executed. Until the processes are completed with respect to objects adjacent to the processing target object, the processes of steps S16 to S19 are repeatedly executed.

The number of adjacent processing target objects in steps S16 to S19 is maximum four. For example, in a case where an object is cubic and a processing target face is square, the number of adjacent objects capable of sharing respective faces that form the processing target face is maximum four. The adjacent objects that share the respective faces of the processing target face become processing targets of steps S16 to S19. In a case where there is no adjacent processing target object, the procedure proceeds to step S20 without executing the processes of step S16 to S19.

First, a priority (B) of an adjacent processing target object is read from the object master table in the RAM 12 or the storage 13 (step S16). Then, it is determined whether the priority (A) read in step S13 is larger than the priority (B) read in step S16 (step S17).

As shown in FIG. 5, for example, in a case where an object ID of a processing target object is "Obj-001" and an object ID of an adjacent object is "Obj-004", since the priority (A) is "2" and the priority (B) is "3", it is determined that the priority (B) is larger than the priority (A). Further, for example, in a case where an object ID of a processing target object is "Obj-001" and an object ID of an adjacent object is "Obj-007", since the priority (A) is "2" and the priority (B) is "0", it is determined that the priority (A) is larger than the priority (B).

In a case where it is determined that the priority (B) is larger than the priority (A) (YES in step S17), a change flag is set (step S18). If the change flag is set, the procedure proceeds to the processes for the next adjacent object (step S19), and the processes from step S16 are started. On the other hand, in a case where it is deter mined that the priority (B) is not larger than the priority (A), that is, in a case where it is determined that the priority (A) is the same as the priority (B), or in a case where the priority (A) is larger than the priority (B) (NO in step S17), the procedure proceeds to the processes for the next adjacent object without setting the change flag (step S19).

On the other hand, in a case where it is determined that the priority (B) is not larger than the priority (A), that is, in a case where it is determined that the priority (A) is the same as the priority (B), or in a case where the priority (A) is larger than the priority (B) (NO in step S17), the procedure proceeds to the processes for the next adjacent object without setting the change flag (step S19).

If the processes of steps S16 to S19 are completed with respect to all the adjacent processing target objects, the procedure proceeds to step S20 and thereafter. First, it is deter mined whether a change flag is set with respect to a processing target face (step S20).

In step S18, in a case where a change flag is not set through priority comparison with a certain adjacent object (NO in step S20), a texture corresponding to an attribute of a processing target object is identified as a first display mode according to a texture master table, the identified texture is attached to the processing target face (step S22).

As a case considered as a case where a change flag is not set, for example, there is a case where there is no object adjacent to a processing target object, or a case where even if there is an adjacent object, the adjacent object is not an object having a higher priority compared with that of the processing target object. In such a case, a texture according to an attribute of the processing target object is attached to a processing target face, regardless of an attribute of the adjacent object. Further, when expressing an artifact, there is a case where a user wants to more clearly express a boundary of objects. In such a case, a special setting for preventing a change flag from being set in an object may be performed.

In step S22, different textures may be attached according to whether a processing target face is an upper or lower face parallel to a horizontal direction in a virtual space or a side face perpendicular to the horizontal direction. In this way, even in the same object, by performing suitable display according to whether a processing target face is an upper or lower face, or a side face, it is possible to perform realistic object display.

FIG. 6 is a diagram showing a texture master table corroding to at least one of embodiments of the invention. For example, an object ID 42, an object attribute 43, an adjacent object type 44, and texture data 45 are stored in association with a texture ID 41 in a texture master table 40 shown in FIG. 6.

In step S22, since a texture corresponding to an object is identified as a display mode, a texture in which the adjacent object type 44 in the texture master table 40 is set to "none" is adopted. For example, in a case where the object ID 42 of a processing target object is "Obj-001", texture data of "soil" corresponding to a texture ID "txt0001" is attached to a processing target face, and in a case where the object ID 42 of a processing target object is "Obj-004", texture data of "grass field" corresponding to a texture ID "txt0101" is attached to a processing target face.

On the other hand, in step S18, in a case where the change flag is set through the priority comparison with the certain adjacent object (YES in step 20), textures corresponding to a processing target object and an adjacent are identified as second display modes according to a texture master table, and the identified texture is attached to the processing target face (step S21).

In step S21, since textures corresponding to a processing target object and an adjacent object are identified as display modes, textures to be attached are identified by referring to the texture master table 40 according to the types of an object of a processing target face and an adjacent object which is based on setting of a change flag.

For example, in a case where the object ID 42 of the processing target object is "Obj-001" and the adjacent object which is based on the setting of the change flag is "grass field", texture data of "soil, grass field" corresponding to a texture ID "txt0002" is attached to the processing target face. Further, in a case where the object ID 42 of the processing target object is "Obj-001" and adjacent objects which are based on the setting of the change flag are "grass field" and "grass field" (that is, in a case where two adjacent objects are present and their types are all "grass field"), texture data of "soil, grass field, grass field" corresponding to a texture ID "txt0103" is attached to the processing target face.

For example, it is preferable that the texture data "soil, grass field", and the texture data "soil, grass field, grass field" are attached to the processing target face in a case where the type of a processing target object is "soil" and the type of an adjacent object is "grass field", and that a most part of the texture corresponds to display content relating to "soil" corresponding to the type of the processing target object, and the remaining part corresponds to display content relating to "grass field" corresponding to the type of the adjacent object.

By displaying the processing target face in this way, it is possible to perform display so that the object gradually changes from "soil" to "grass field". Further, a design may be performed so that the influence of adjacent objects becomes stronger in the texture "soil, grass field, grass field" used in a case where more change flags are set, compared with that in the texture "soil, grass field", and so that the amount of display content relating to the "grass field" becomes larger.

In a case where an object is cubic, a processing target face is square, and a texture to be attached is also square. For example, in the case of the texture data "soil·grass field", display content relating to the "grass field" may be assigned to only the vicinity of one square side of the texture, and display content relating to "soil" corresponding to the type of the processing target object may be assigned to the remaining most part thereof.

Figure 7:
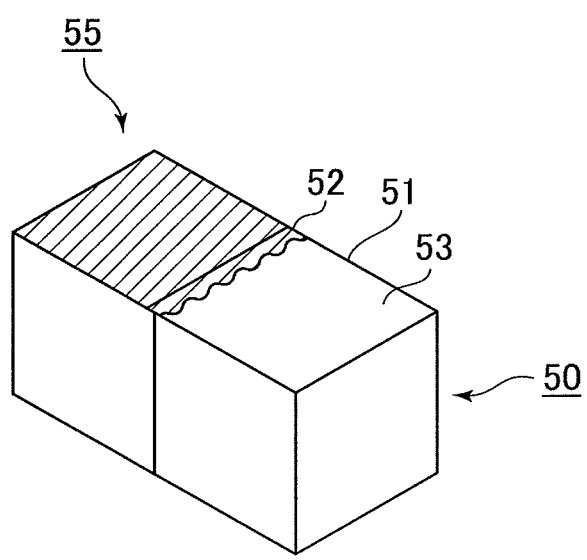
FIG. 7 is a diagram showing a texture attached to an object, corresponding to at least one of embodiments of the invention.

FIG. 7 is a diagram showing a texture attached to an object corresponding to at least one of embodiments of the invention. As shown in FIG. 7, a processing target object 50 is adjacent to an adjacent object 55. The processing target object 50 is an object relating to "soil", and the adjacent object 55 is an object relating to "grass field". Among processing target faces 51, a display 52 relating to "grass field" is displayed to have a linear shape and a width that is slightly changed, and among the processing target faces 51, parts other than the display 52 relating to "grass field" are occupied by a display 53 relating to "soil".

By displaying the processing target face in this way, it is possible to display a terrain without discomfort while preventing a boundary line between objects from being linearly formed. In this case, a texture is attached so that display content relating to the "grass field" of the processing target object is in contact with an adjacent object which is based on setting of a change flag.

In step S21 or S22, if a display mode of a processing target face is identified and the identified texture is attached to the processing target face, the processing target face transitions to the next face (step S23), and the processes of steps S14 to S22 are executed for the next processing target face.

If the processes are completed with respect to all the faces of the object, the processing target object transitions to the next object (step S24), and the processes of steps S12 to S23 are executed for the next processing target object. If the processes of steps S12 to S23 are executed with respect to all the objects placed in the virtual space, a process of perspective transforming the inside of the virtual space and drawing a generated image using the graphics processor 15 is executed (step S25).

According to an aspect of the third embodiment, since a display mode of a face of an object which is not in contact with a different object is identified according to a combination of an attribute of the object and an attribute of an adjacent object which is adjacent to the object, it is possible to perform display so that the attribute of the object gradually changes, and thus, it is possible to display a terrain due to the object without discomfort.

According to an aspect of the third embodiment, since a display mode for identifying a display mode of a face which is not in contact with a different object includes display content according to an attribute of an object, and display content according to an attribute of a placed object adjacent to the object, it is possible to display a terrain without discomfort while preventing a boundary line between the objects from being linearly formed.

According to an aspect of the third embodiment, since an arbitrary display mode corresponding to an attribute of an object among plural display modes is identified as a display mode of a face of an object which is not in contact with a different object, it is possible to display an object in plural display modes even when an attribute thereof is the same, and thus, it is possible to perform realistic object display.

According to an aspect of the third embodiment, since a display mode is identified according to whether a face of an object which is not in contact with a different object is an upper or lower face parallel to a horizontal direction in a virtual space or a side face perpendicular to the horizontal direction, it is possible to make a display mode different according to whether a processing target face is an upper or lower face, or a side face even in the same object, and thus, it is possible to perform realistic object display.

In the third embodiment, the "computer apparatus", the "virtual space", the "attribute", the "object", the "display screen", and the "drawing" are the same as the contents disclosed in the first embodiment, respectively. In the third embodiment, the "texture" is an image for expressing a color or pattern of a face of an object, for example.

Fourth Embodiment

Next, an outline of a fourth embodiment of the invention will be described. A configuration of a computer apparatus according to the fourth embodiment may adopt the same configuration as in the block diagram of FIG. 3. Further, in the fourth embodiment, a flowchart of a program execution process may adopt the same flowchart as that shown in FIG. 4, except for a part thereof.

In the third embodiment, a configuration in which in a case where an object having a different attribute is placed to be adjacent to a processing target object, a display mode of a face of the processing target object which is not in contact with a different object is identified according to the processing target object and the adjacent object is shown, but for example, the invention may be similarly applied to a case where an adjacent object is not placed. That is, a case where there is no adjacent object may be handled as a case where a transparent object is placed in a virtual box adjacent to a processing target object.

In the flowchart of FIG. 4, processes of steps S11 to S14 are the same as in the third embodiment. Determination in step S15 is not performed, and a process of step S16 is executed after performing the process of step S14.

In step S16, a priority (B) of a transparent object adjacent to a processing target object is read from the object master table in the RAM 12 or the storage 13. Alternatively, the priority of the transparent object may be determined in advance to be larger than that of other objects.

Then, it is determined whether the priority (A) of the processing target object read in step S13 is larger than the priority (B) read in step S16 (step S17). Normally, the priority (B) of the transparent object is set to be larger than the priority (A) of the processing target object. In a case where it is determined that the priority (B) is larger than the priority (A) (YES in step S17), a change flag is set (step S18). If the change flag is set, the procedure proceeds to the processes for the next adjacent object (step S19), and the processes from step S16 are started.

If the processes of steps S16 to S19 are completed with respect to all the processing target adjacent objects, the procedure proceeds to step S20 and thereafter. First, it is determined whether a change flag is set with respect to a processing target face (step S20). In a case where a change flag is set based on an adjacent transparent object (YES in step S20), a texture corresponding to the transparent object adjacent to the processing target object is identified as a second display mode according to the texture master table, and the identified texture is attached to the processing target face (step S21).

In a case where an object is cubic, a processing target face is square, and a texture to be attached is also square. For example, in a case where the type of a processing target object is "soil", a color different from a color of "soil" may be displayed with respect to only the vicinity of one side of the square of the texture, and display content relating to "soil" corresponding to the type of the processing target object may be assigned to the remaining most part thereof.

In this case, it is possible to display a color different from a color of "soil" along one side of the square. By displaying the processing target face in this way, in a case where a processing target object is adjacent to a transparent object, it is possible to display a contour of the processing target object.

In the fourth embodiment, a case where there is no adjacent object or a case where an adjacent object is a transparent object will be described with reference to the accompanying drawings.

FIGS. 8A and 8B are diagrams relating to attachment of textures for objects corresponding to at least one of embodiments of the invention. FIGS. 8A and 8B are images obtained from a viewpoint of a virtual camera that is present in a virtual space, which shows an example of a grass field in the virtual space. Here, steps generated due to placed objects can be confirmed.

FIG. 8A is an image before a texture in the above-described step S21 is attached. On the other hand, FIG. 8B is an image after the texture in step S21 is attached. As shown in FIG. 8A, in a case where the same types of objects are placed, there is a problem in that a user cannot recognize that steps are present according to an angle of the virtual camera. However, as shown in FIG. 8B, by attaching textures, even in a case where steps are generated due to placement of the same types of objects, a user can clearly recognize the steps, which is advantageous. Particularly, such a configuration is useful in a game in which the same types of objects are placed and a viewpoint of a virtual camera can be freely moved, such as a sandbox type game.

According to an aspect of the fourth embodiment, even in a case where there is no object in a virtual box adjacent to a processing target object (in a case where a transparent object is placed in an adjacent virtual box), by setting a display mode of the processing target object to a different display mode, it is similarly possible to display contours of the objects. Even in a case where the same types of objects having different distances from a viewpoint are displayed in an overlapping manner, it is possible to visually recognize a difference of the objects. Thus, it is possible to display the objects with high visibility without performing a process having a large load such as shading.

In the fourth embodiment, the "computer apparatus", the "virtual space", the "attribute", the "object", the "display screen", and the "drawing" are the same as the contents disclosed in the first embodiment, respectively. In the fourth embodiment, the "texture" is an image for expressing a color or pattern of a face of an object, for example. It should be noted that the "transparent object" means a concept including a case where a transparent object is placed, and a case where an object is not placed in a virtual object adjacent to a processing target object.

APPENDIX

The above-described embodiments are disclosed so that those skilled in the art can realize the following inventions.

[1] A program executed in a computer apparatus that causes the computer apparatus to function as:

an object placer that places a rectangular parallelepiped object having a given attribute and a display mode according to the given attribute in a virtual space;

a first display mode identifier that identifies a display mode of a face of a placed object which is not in contact with a different placed object according to an attribute of the placed object;

a second display mode identifier that identifies, with respect to at least one of a plurality of placed objects which are adjacent to each other and have different attributes, a display mode of a face thereof which is not in contact with a different placed object according to an attribute of the placed object and an attribute of an adjacent placed object; and a drawer that performs drawing for displaying a placed object on a display screen, according to a display mode identified by the first display mode identifier and a display mode identified by the second display mode identifier, wherein the second display mode identifier preferentially performs execution with respect to the first display mode identifier.

[2] The program according to [1], wherein a priority relating to which placed object among placed objects which are adjacent to each other has its display mode identified is set for each attribute, and wherein the second display mode identifier identifies a display mode of a placed object having an attribute of a low priority among the placed objects which are adjacent to each other.

[3] The program according to [1] or [2], causing the computer apparatus to further function as:

a second display mode storage that stores a display mode of a face which is not in contact with a different placed object, identified by the second display mode identifier, wherein the second display mode storage stores a display mode for identifying the display mode of the face which is not in contact with the different placed object for each combination of an attribute of a placed object which is a display mode identification target in the second display identifier and an attribute of a placed object adjacent to the placed object as the target, and the second display identifier identifies a display mode of a face of the placed object which is not in contact with the different placed object according to the combination of the attribute of the placed object and the attribute of the placed object adjacent to the former placed object.

[4] The program according to [3], wherein the display mode for identifying the display mode of the face which is not in contact with the different placed object, stored in the second display mode storage includes display content according to the attribute of the placed object which is the display mode identification target and display content according to the attribute of the placed object adjacent to the former placed object.

[5] The program according to any one of [1] to [4], causing the computer apparatus to further function as:

a first display mode storage that stores a plurality of display modes for each attribute of an object as a display mode of a face which is not in contact with a different placed object, wherein the first display mode identifier identifies an arbitrary display mode corresponding to an attribute of a placed object among the plurality of display, modes stored in the first display mode storage as the display mode of the face of the placed object which is not in contact with the different placed object.

[6] The program according to any one of [1] to [5], wherein the first display mode storage stores a display mode of an upper or lower face parallel to a horizontal direction in the virtual space and a display mode of a side face perpendicular to the horizontal direction, for each attribute of an object, as the display mode of the face which is not in contact with the different placed object, and wherein the first display mode identifier identifies a display mode according to whether the face of the placed object which is not in contact with the different placed object is the upper or lower face parallel to the horizontal direction in the virtual space, or the side face perpendicular to the horizontal direction, based on the display modes of the upper or lower face and the side face stored in the first display mode storage.

[7] A computer apparatus including:

an object placer that places a rectangular parallelepiped object having a given attribute and a display mode according to the given attribute in a virtual space;

a first display mode identifier that identifies a display mode of a face of a placed object which is not in contact with a different placed object according to an attribute of the placed object;

a second display mode identifier that identifies, with respect to at least one of a plurality of placed objects which are adjacent to each other and have different attributes, a display mode of a face thereof which is not in contact with a different placed object according to an attribute of the placed object and an attribute of an adjacent placed object; and a drawer that performs drawing for displaying a placed object on a display screen, according to a display mode identified by the first display mode identifier and a display mode identified by the second display mode identifier, wherein the second display mode identifier preferentially performs execution with respect to the first display mode identifier.

[8] An execution method executed in a computer apparatus, including:

an object placing step of placing a rectangular parallelepiped object having a given attribute and a display mode according to the given attribute in a virtual space;

a first display mode identifying step of identifying a display mode of a face of a placed object which is not in contact with a different placed object according to an attribute of the placed object;

a second display mode identifying step of identifying, with respect to at least one of a plurality of placed objects which are adjacent to each other and have different attributes, a display mode of a face thereof which is not in contact with a different placed object according to an attribute of the placed object and an attribute of an adjacent placed object; and a drawing step of performing drawing for displaying a placed object on a display screen, according to a display mode identified in the first display mode identifying step and a display mode identified in the second display mode identifying step, wherein the second display mode identifying step preferentially performs execution with respect to the first display mode identifying step.

The invention claimed is:

1. A non-transitory computer-readable recording medium having recorded thereon a program which is executed in a computer apparatus that causes the computer apparatus to execute:

placing a rectangular parallelepiped object having a given attribute and a display mode according to the given attribute in a virtual space;

identifying a first display mode of a face of a placed object which is not in contact with a different placed object according to an attribute of the placed object;

identifying, with respect to at least one of a plurality of placed objects which are adjacent to each other and have different attributes, a second display mode of a face thereof which is not in contact with the different placed object according to an attribute of the placed object and an attribute of an adjacent placed object; and drawing, for displaying a placed object on a display screen, according to the first display mode identified and the second display mode identified, wherein the identifying of the second display mode is performed instead of the identifying of the first display mode, wherein a priority relating to which placed object among placed objects which are adjacent to each other has its display mode identified is set for each attribute, and wherein the identifying of the second mode includes identifying a display mode of a placed object having an attribute of a low priority among the placed objects which are adjacent to each other.

2. The non-transitory computer-readable recording medium according to claim 1, causing the computer apparatus to further execute:

storing a display mode of a face which is not in contact with a different placed object, identified by the second display mode identifier, wherein the storing further stores a display mode for identifying the display mode of the face which is not in contact with the different placed object for each combination of an attribute of a placed object which is a display mode identification target in the identifying of the second display mode and an attribute of a placed object adjacent to the placed object as the target, and the identifying of the second display mode includes identifying a display mode of a face of the placed object which is not in contact with the different placed object according to the combination of the attribute of the placed object and the attribute of the placed object adjacent to a former placed object.

3. The non-transitory computer-readable recording medium according to claim 1, wherein the display mode for identifying the display mode of the face which is not in contact with the different placed object, includes display content according to the attribute of the placed object which is the display mode identification target and display content according to the attribute of the placed object adjacent to a former placed object.

4. The non-transitory computer-readable recording medium according to claim 1, causing the computer apparatus to further execute:

storing a plurality of display modes for each attribute of an object as a display mode of a face which is not in contact with a different placed object, wherein the identifying of the first display mode includes identifying an arbitrary display mode corresponding to an attribute of a placed object among the plurality of display modes stored as the display mode of the face of the placed object which is not in contact with the different placed object.

5. The non-transitory computer-readable recording medium according to claim 1, causing the computer apparatus to further execute:

storing a display mode of an upper or lower face parallel to a horizontal direction in the virtual space and a display mode of a side face perpendicular to the horizontal direction, for each attribute of an object, as the display mode of the face which is not in contact with the different placed object, and wherein the identifying of the first display mode includes identifying a display mode according to whether the face of the placed object which is not in contact with the different placed object is the upper or lower face parallel to the horizontal direction in the virtual space, or the side face perpendicular to the horizontal direction, based on the display modes of the upper or lower face and the side face stored in the storing.

6. A computer apparatus comprising:

a processor that executes:

placing a rectangular parallelepiped object having a given attribute and a display mode according to the given attribute in a virtual space, identifying a first display mode of a face of a placed object which is not in contact with a different placed object according to an attribute of the placed object, and identifying, with respect to at least one of a plurality of placed objects which are adjacent to each other and have different attributes, a second display mode of a face thereof which is not in contact with the different placed object according to an attribute of the placed object and an attribute of an adjacent placed object; and a graphics processor that executes drawing, for displaying a placed object on a display screen, according to the first display mode identified and the second display mode identified, wherein the identifying of the second display mode is performed instead of the identifying of the first display mode, wherein a priority relating to which placed object among placed objects which are adjacent to each other has its display mode identified is set for each attribute, and wherein the identifying of the second mode includes identifying a display mode of a placed object having an attribute of a low priority among the placed objects which are adjacent to each other.

7. A computer processing method executed in a computer apparatus, comprising:

placing, by a processor, a rectangular parallelepiped object having a given attribute and a display mode according to the given attribute in a virtual space;

identifying, by the processor, a first display mode of a face of a placed object which is not in contact with a different placed object according to an attribute of the placed object;

identifying, by the processor and with respect to at least one of a plurality of placed objects which are adjacent to each other and have different attributes, a second display mode of a face thereof which is not in contact with a different placed object according to an attribute of the placed object and an attribute of an adjacent placed object; and drawing, by a graphics processor for displaying a placed object on a display screen, according to the first display mode and the second display mode, wherein the identifying of the second display mode is performed instead of the identifying of the first display mode, wherein a priority relating to which placed object among placed objects which are adjacent to each other has its display mode identified is set for each attribute, and wherein the identifying of the second mode includes identifying a display mode of a placed object having an attribute of a low priority among the placed objects which are adjacent to each other.

* * * * *